United States Patent [19]

Schmid et al.

[11] 4,297,073
[45] Oct. 27, 1981

[54] METHOD AND APPARATUS FOR WITHDRAWING AGRICULTURAL MATERIALS FROM STORAGE

[76] Inventors: Franz Schmid, Bergstr. 5; Reinhard Schmid, Vordertal 2, both of D-7612 Fischerbach, Fed. Rep. of Germany

[21] Appl. No.: 54,616

[22] Filed: Jul. 3, 1979

[30] Foreign Application Priority Data

Jul. 8, 1978 [DE] Fed. Rep. of Germany ....... 2830068

[51] Int. Cl.³ .................... B65G 65/04; A01F 25/20
[52] U.S. Cl. .................... 414/704; 414/469; 414/703; 241/101.7
[58] Field of Search ............... 241/101 A, 101.7, 283; 414/469, 491, 492, 493, 525 R, 540, 551, 553, 554, 566, 622, 703, 704, 705

[56] References Cited

U.S. PATENT DOCUMENTS

| 2,705,082 | 3/1955 | Heimsoth | 414/685 |
| 2,707,058 | 4/1955 | Fischer | 414/704 |
| 2,768,760 | 10/1956 | Pilch | 414/722 |
| 4,187,049 | 2/1980 | Jones | 414/704 |

FOREIGN PATENT DOCUMENTS

| 655747 | 1/1963 | Canada | 414/551 |
| 2408861 | 10/1974 | Fed. Rep. of Germany | 414/540 |
| 2750525 | 5/1979 | Fed. Rep. of Germany | 241/101.7 |

*Primary Examiner*—Bruce H. Stoner, Jr.
*Assistant Examiner*—Terrance L. Siemens
*Attorney, Agent, or Firm*—Peter K. Kontler

[57] ABSTRACT

An apparatus for withdrawing compressed fodder or similar agricultural material from a pile has an engaging tool which is mounted on a cantilever arm arrangement. This arrangement is capable of reaching over a quantity of fodder to be withdrawn and engaging behind the quantity from above so that the remainder of the material will not be loosened. The engaging tool shifts the quantity of fodder into a receptacle which is mounted on a common support with the cantilever arm arrangement, the support being adapted to be mounted on a tractor. Hydraulic cylinder-and-piston units connected to the hydraulic system of the tractor are used for moving the engaging tool into and from the receptacle.

16 Claims, 2 Drawing Figures

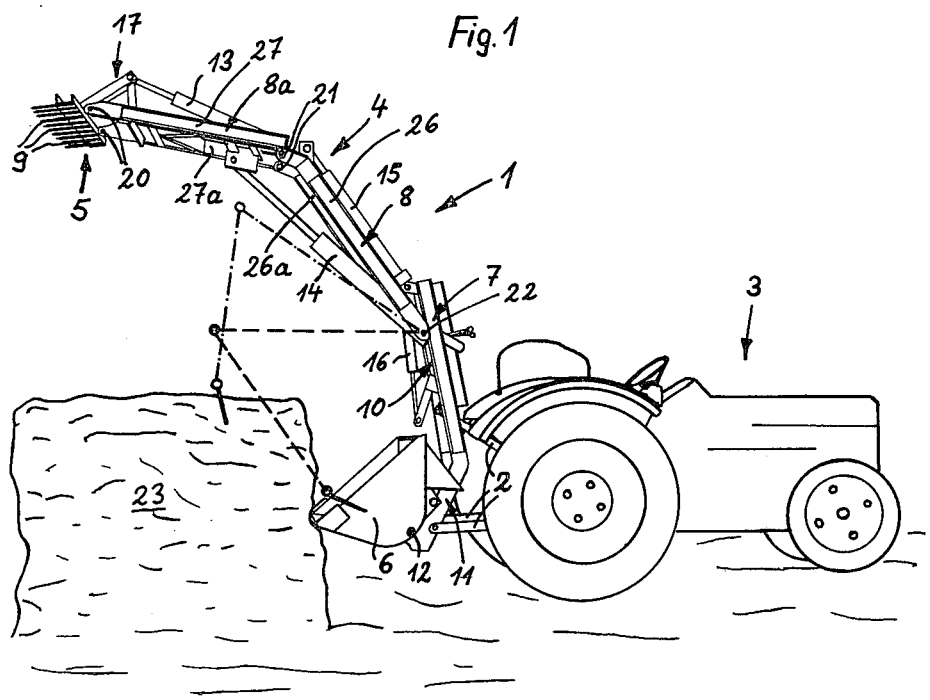
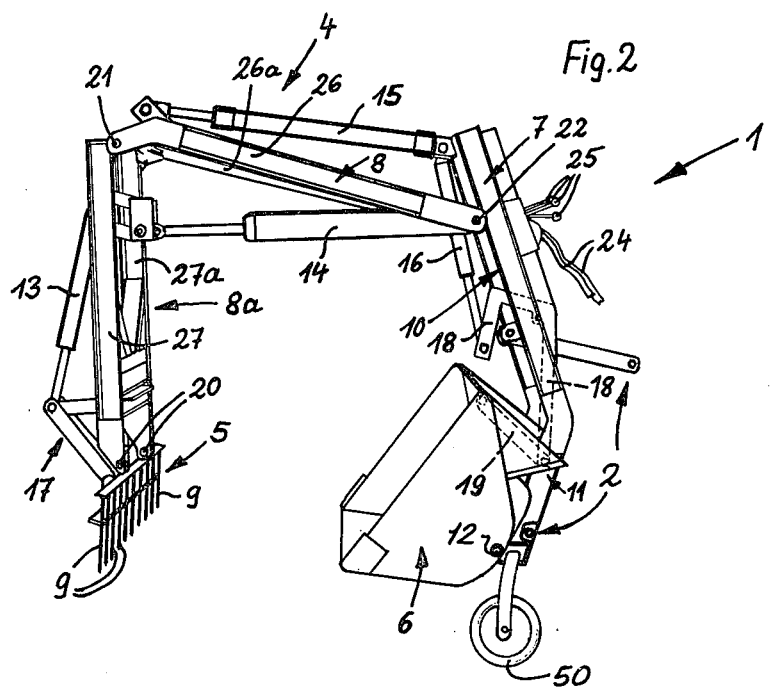

METHOD AND APPARATUS FOR WITHDRAWING AGRICULTURAL MATERIALS FROM STORAGE

BACKGROUND OF THE INVENTION

The present invention relates to withdrawal of agricultural materials, such as pressed fodder, from storage.

It is already known that fodder and similar agricultural materials may be stored in silos and similar storage facilities. When it is desired or necessary to remove a quantity or portion of the stored agricultural material from the storage facility, it is conventional to engage the quantity to be withdrawn from below with the aid of a fork-shaped implement, and to lift the engaged quantity out of the silo. However, this approach is disadvantageous in that the fodder or a similar agricultural material which stays in the storage facility is loosened in the region adjacent to the quantity being withdrawn, so that the remaining agricultural material is exposed to the danger of fermentation due to the action of aerobic microorganisms, especially when the agricultural material being stored is ensilage, corn or like fodder which is introduced into the storage facility in fresh condition and is stored practically without access of ambient air thereto.

In order to avoid this drawback, it has been proposed to use a saw-like arrangement by means of which the quantity of agricultural material to be withdrawn is severed from the remainder of the material. While it is true that, when this approach is used, any significant loosening of the remaining agricultural material or fodder is avoided, there are encountered certain other disadvantages. So, for instance, the arrangement capable of operating in this manner is very expensive and prone to malfunction. In addition, the withdrawal of fodder by means of this arrangement takes a relatively long period of time.

OBJECTS AND SUMMARY OF THE INVENTION

It is an object of the present invention to provide a method of withdrawing pressed fodder and like agricultural materials which does not exhibit the disadvantages of the prior-art methods.

Another object of the invention is to provide a method of withdrawing fodder which renders it possible to withdraw the fodder rather rapidly and in a simple manner.

Still another object of the invention is to provide a method of withdrawing fodder which avoids loosening of the fodder remaining in the storage facility and thus the possibility of rotting of the remaining fodder.

A concomitant object of the invention is to provide an apparatus capable of carrying out the above method.

Yet another object of the present invention is to so construct the apparatus as to be simple, easy to operate and reliable.

One feature of the present invention resides in the provision of a method of withdrawing pressed fodder and similar agricultural materials from storage which, comprises the steps of reaching over a quantity of the agricultural material; engaging the quantity from above; and removing the quantity from the storage. In this manner, the possibility of loosening the remaining fodder or other agricultural material is avoided.

Another feature of the present invention resides in the provision of an apparatus which is especially suited for the practice of the method of the present invention and includes an engaging tool capable of separating a quantity of agricultural material from the remainder of such material, and preferably also a receptacle capable of receiving at least a portion of the separated quantity. The engaging tool is mounted on a movable cantilever arm arrangement or a similar arrangement. When this construction is resorted to, the engaging tool can be introduced into the fodder from above even when the body of the fodder has a substantial height.

It is advantageous when the above-mentioned receptacle is arranged close to the ground, and when the engaging tool is movable upwardly of the receptacle and can be brought at least close to the receptacle. As a result of this, the withdrawn or removed fodder can be directly transported from the supply heap into the receptacle, so that the latter can also be used for transporting the withdrawn quantity of fodder or similar agricultural material to a feeding location or the like. A structurally simple and very compact construction is obtained when the receptacle and the cantilever arm arrangement which has the engaging tool mounted thereon are mounted on a common support. Advantageously, the apparatus according to the present invention is constructed as an attachment to a tractor, and is equipped with connecting elements which connect the apparatus to the tractor, preferably at least at three locations. As a result of this, the apparatus of the present invention can be simply connected with a tractor when the occasion arises for the use of the apparatus. It is further advantageous when the cantilever arm arrangement includes two elongated cantilever arm elements which are articulately connected to each other. This results in good movability and an extensive radius of action of the engaging tool, in that the latter can be lifted to a relatively high elevation while the apparatus in its entirety takes up only a minimal amount of space and has a relatively low height in collapsed condition. Thus, a tractor having the apparatus of the present invention mounted thereon can be driven into relatively low stables or the like, but can also be utilized when the storage height of the fodder is rather substantial.

Preferably, even the engaging tool is pivotally connected with the cantilever arm arrangement. In this manner, it is possible to select an advantageous position of the engaging tool during withdrawal or removal of the fodder, this position being, for all intents in purposes, independent on the position of the cantilever arm arrangement or the cantilever arm elements thereof. It is particularly advantageous when cylinder-and-piston units, especially hydraulic units, are used as a means for moving the cantilever arm arrangement or the arm elements thereof, for the engaging tool, and for the receptacle. A particular advantage of such construction is that relatively high moving forces can be transmitted by means of the hydraulic cylinder-and-piston units and, in addition thereto, pressurized hydraulic medium is readily available for use in these units when the apparatus according to the present invention is used as an attachment to a tractor.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a perspective side elevational view of an apparatus which embodies the present invention and is mounted on a tractor; and FIG. 2 is a perspective side elevational view of the apparatus of FIG. 1 in a different position and all by itself.

DESCRIPTION OF THE PREFERRED EMBODIMENTS

Referring first to FIG. 1, the reference numeral 1 has been used for designating a fodder-withdrawing apparatus of the present invention in its entirety. The apparatus 1 is shown in FIG. 1 as being mounted on the rearward three-point suspension 2 of a tractor 3.

The apparatus 1 includes a cantilever arm arrangement 4, and an engaging tool 5 which is mounted at the free end of the cantilever arm arrangement 4. The apparatus 1 further includes a receptacle 6 which is capable of receiving at least a portion of the quantity of fodder which is engaged and withdrawn by the engaging tool 5 during the operation of the apparatus 1. The cantilever arm arrangement 4 and the receptacle 6 are mounted on a common supporting frame 7. The frame 7 incorporates conventional connecting elements for connecting the frame 7 to the three-point suspension 2 of the tractor 3. The receptacle 6 is pivotally connected to the supporting frame 7 at the lower end of the frame 7, while the cantilever arm arrangement 4 is pivotally connected to the frame 7 at the upper end of the latter.

The cantilever arm arrangement 4 includes two elongated and pivotally connected cantilever arm elements 8 and 8a. The engaging tool 5 is mounted on the free end of the cantilever arm element 8a. The connection of the engaging tool with the element 8a is such that the tool 5 is pivotable relative to the element 8a. The engaging tool 5 is substantially rake-shaped and includes a plurality of parallel tines 9.

The supporting frame 7, on which the cantilever arm arrangement 4 and the receptacle 6 are mounted, includes a frame 10. In the position of use which is illustrated in FIG. 1, the frame 10 extends substantially vertically and transversely of the tractor 3. The lower end portion 11 of the frame 10 is inclined away from the plane of the remainder of the frame 10 and also away from the tractor 3. The length of the inclined lower end portion 11 substantially corresponds to the height of the receptacle 6. As a result of such construction, the receptacle 6 can be tilted within a relatively large range about its longitudinal axis 12 and, especially, it can also assume a position in which its opening is located in a substantially horizontal plane. The receptacle 6 assumes such position especially during transport of the fodder which is at least partially accommodated in the receptacle 6.

The cantilever arm elements 8 and 8a, the engaging tool 5, and the receptacle 6 are movably mounted and can be moved by means of hydraulic cylinder-and-piston units. A hydraulic cylinder-and-piston unit 13 serves for moving the tool 5. It is mounted on the cantilever arm element 8a and its piston rod is articulately connected to a lever 17 which is connected to the engaging tool 5 for joint pivoting therewith. A hydraulic cylinder-and-piston unit 14 serves for moving the cantilever arm element 8a relative to the cantilever arm element 8. The cantilever arm arrangement 4 as a whole can be moved by means of a hydraulic cylinder-and-piston unit 15 which is articulately connected to the cantilever arm element 8 and to the supporting frame 7.

A hydraulic cylinder-and-piston unit 16 which is connected to the supporting frame 7 serves for tilting of the receptacle 6. The piston rod of this unit 16 is connected with a bell crank lever 18 which, in turn, is articulately connected to a motion transmitting lever 19 which is connected with the receptacle 6. A pivot 20 between the tool 5 and the element 8a, a pivot 21 between the elements 8 and 8a, as well as a pivot 22 between the arrangement 4 and the supporting frame 7 are parallel to each other. The movements of the individual components, therefore, take place along a common plane. Even the receptacle 6 is mounted for movement along this common plane. The pivoting range of the receptacle 6 along this common plane is approximately 90°.

In the illustrated embodiment of the present invention, the range of pivoting of the engaging tool 5 is about 150°. FIG. 1 shows the cantilever arm arrangement 4, by solid lines, in the vicinity of its upper end position, while a possible lever end position is indicated by broken lines, and an intermediate position, in which the engaging tool 5 engages the material 23 from above, is indicated by phantom lines. The quantity of material 23 which is so engaged can be transported, for instance, by actuating the unit 14 forwardly, that is, toward the tractor 3 and into the receptacle 6. During such operation, the receptacle 6 may brace itself against the supply of fodder or similar agricultural material 23, as shown in FIG. 1. In this manner, a substantial force can be exerted by the tool 5. This is especially advantageous when the material 23 is substantially compressed.

As a result of subdivision of the cantilever arm arrangement 4 into the elements 8 and 8a, and of the pivotable connection of the elements 8 and 8a with each other as well as with the supporting frame 7 and with the engaging tool 5, there is obtained a very accurate positioning of the engaging tool 5 which can conform to the various conditions which are encountered during the use of the apparatus 1. In this manner, the desired withdrawal of a predetermined quantity of material 23 can be accomplished without encountering any difficulties. In addition to this advantageous movability, it is further advantageous that the apparatus 1 as a whole has a relatively small height and is of compact design. This is of considerable significance inasmuch as the fodder 23 which is introduced into the receptacle 6 has to be eventually transported to the feeding locations where, very often, relatively low entrances, for instance, into stables, stalls or the like, have to be passed through. On the other hand, even high heaps of fodder 23 can be handled by the apparatus in the extended position of the cantilever arm arrangement 4 substantially as shown in FIG. 1.

Hoses 24 shown in FIG. 2 can be used for supplying pressurized hydraulic medium to the units 13 to 16. The hoses 24 can be connected to the hydraulic system of the tractor 3. Manually operated levers 25 which are connected to conventional four-way valves, can be used for actuating the individual hydraulic cylinder-and-piston units 13 to 16.

The hydraulic system for the operation of the receptacle 6 is so constructed that the receptacle 6 automatically drops downwardly when the pressure of the hydraulic medium is relieved so that the contents of the receptacle 6 can be emptied. If need be, any fodder 23 which remains in the receptacle 6 can be removed by means of the engaging tool 5. Under these circumstances, it is advantageous when the width of the tool 5 is less than the inner width of the receptacle 6, so that the rake-like engaging tool 5 can enter into the interior of the receptacle 6.

The cantilever arm arrangement 4, or each of its cantilever arm elements 8, 8a, includes two neighboring interconnected members 26, 26a or 27, 27a. The distance of the juxtaposed members 26, 26a or 27, 27a substantially corresponds to the width of the frame 10 of the support 7. In this manner, there is obtained a good stability and especially also a good resistance of the cantilever arm arrangement 4 to torsion.

The already mentioned compact construction of the apparatus 1 and also the substantial operating range thereof is further enhanced by the substantially identical length of the frame 10 and of the cantilever arm element 8a which carries the engaging tool 5. Advantageously, even the cantilever arm element 8 has substantially the same length. The receptacle 6 can be provided at its underside, or the support 7 can be provided at its lower end 11, with conventional ground-engaging means, such as a ground-engaging wheel 50 (see FIG. 2), roller or the like. A ground-engaging element is especially advantageous when the receptacle 6 has substantial dimensions so that it can receive a large amount of pressed fresh fodder 23. In this manner, it is avoided that the tractor 3 is excessively loaded at its rear end during transport of the fodder within the receptacle 6.

The apparatus 1 of the present invention, in its entirety, exhibits the important advantage that, during withdrawal or removal of the fodder 23, loosening of the remaining neighboring fodder 23 is avoided. This is of a particular significance when the fodder 23 is pressed fresh fodder, inasmuch as the latter rots rather rapidly in its loosened condition.

Under certain circumstances, the apparatus 1 according to the present invention can also be used for other purposes. In order to be able to do this, the engaging tool 5 is so mounted on the cantilever arm element 8a as to be easily interchangeable. For instance, a spade-shaped tool, a planning tool, a plate or the like could be mounted on the element 8a instead of the rake-like engaging tool 5.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

We claim:

1. A method of withdrawing pressed agricultural material from a pile of such material, comprising the steps of separating a quantity of agricultural material from the pile including effecting the penetration of a tool into the pile from above and movement of the tool to separate said quantity while leaving the consistency of the remaining portion of the pile at least substantially unchanged; and introducing the separated quantity of material into a receptacle, said separating and introducing steps including pivoting the tool about more than two discrete parallel axes and independently of the receptacle.

2. Apparatus for withdrawing pressed agricultural material from a pile of such material, comprising vehicle-mounted supporting means; a mobile material engaging tool having a predetermined width; an arm for said engaging tool, said arm having a first portion articulately connected with said supporting means and a second portion articulately connected with said first portion and said tool; means for moving said engaging tool relative to said arm and for moving said portions relative to each other as well as relative to said supporting means so that said tool can be caused to penetrate into the pile of pressed material from above to separate a quantity of material from the pile while leaving the consistency of the remainder of the material of the pile at least substantially unchanged; and a vehicle-mounted receptacle pivotable between a plurality of positions and having an opening whose width at least equals said predetermined width, said receptacle being located in the path of movement of said tool so that the latter can enter the receptacle while advancing the separated quantity of material away from the remainder of the pile, said first portion of said arm being moveable independently of said receptacle.

3. An apparatus as defined in claim 2, wherein said supporting means constitutes an attachment to a tractor.

4. An apparatus as defined in claim 2, wherein said receptacle is located close to the ground level and said arm supports said engaging tool for movement between a plurality of positions above said receptacle and at least one further position in which said tool is disposed in the interior of said receptacle.

5. An apparatus as defined in claim 2, further comprising means for securing said receptacle to said supporting means.

6. An apparatus as defined in claim 2, wherein said receptacle is pivotable through an angle of substantially 90°.

7. An apparatus as defined in claim 2, wherein said moving means includes a plurality of cylinder-and-piston units.

8. An apparatus as defined in claim 2, wherein said engaging tool has a substantially rake-like configuration including a plurality of tines.

9. An apparatus as defined in claim 2, wherein said supporting means includes a ground-contacting element.

10. An apparatus as defined in claim 9, wherein said ground-contacting element is a roller.

11. An apparatus as defined in claim 2, wherein said second portion of said arm is movable in a substantially circular trajectory along an arc of at least 90°.

12. An apparatus as defined in claim 2, wherein the articulate connection between said arm and said tool includes means for detachably connecting said engaging tool to said second portion.

13. An apparatus for withdrawing materials, particularly pressed fodder and similar agricultural materials, from a storage, comprising supporting means; an engaging tool; means for mounting said engaging tool on said supporting means for movement from a retracted position in a path over and from above behind a quantity of the material into an engaging position in which said engaging tool engages the quantity; means for moving said engaging tool in said path; and a receptacle of predetermined height mounted on said supporting means and operative for receiving at least a portion of the quantity of the material, said supporting means including a supporting frame extending substantially vertically in a position of use of the apparatus and having an upper portion and a lower portion, said lower portion being inclined relative to said upper portion and having a length substantially corresponding to the height of said receptacle.

14. An apparatus as defined in claim 13, wherein said supporting frame has a predetermined width and said mounting means includes a cantilever arm arrangement including arm members extending along one another at a distance from each other which substantially corresponds to the width of said supporting frame.

15. An apparatus as defined in claim 14, wherein said cantilever arm arrangement includes two elongated cantilever arm elements each including two of said arm members.

16. An apparatus as defined in claim 15, wherein at least that one of said elements which carries said engaging tool has substantially the same length as said supporting frame.

* * * * *